United States Patent [19]

Paro

[11] Patent Number: 5,060,610
[45] Date of Patent: Oct. 29, 1991

[54] COMBUSTION PROCESS FOR INTERNAL COMBUSTION ENGINES USING GASEOUS FUEL

[75] Inventor: Daniel Paro, Kvevlax, Finland

[73] Assignee: Oy Wartsila Diesel International Ltd., Helsinki, Finland

[21] Appl. No.: 586,222

[22] Filed: Sep. 21, 1990

[30] Foreign Application Priority Data

Sep. 26, 1989 [FI] Finland .................. 894533

[51] Int. Cl.$^5$ .............................................. F02B 43/00
[52] U.S. Cl. ............................. 123/300; 123/27 GE;
 123/275; 123/305
[58] Field of Search ............... 123/299, 300, 304, 305,
 123/27 GE, 525, 526, 260, 261, 275

[56] References Cited

U.S. PATENT DOCUMENTS

| | | | |
|---|---|---|---|
| 1,132,581 | 3/1915 | Hein | 123/304 |
| 1,962,283 | 6/1934 | Nordberg | 123/304 |
| 2,723,653 | 11/1955 | Blake et al. | 123/27 GE |
| 4,091,772 | 5/1978 | Heater et al. | 123/27 GE |

FOREIGN PATENT DOCUMENTS

| | | | |
|---|---|---|---|
| 2930670 | 3/1981 | Fed. Rep. of Germany | 123/261 |
| 804024 | 11/1958 | United Kingdom | 123/27 GE |

*Primary Examiner*—Andrew M. Dolinar
*Attorney, Agent, or Firm*—Dellett, Smith-Hill and Bedell

[57] ABSTRACT

An improved combustion process for an internal combustion engine including cylinders provided with inlet and outlet valves as well as inlet and outlet ducts. During a suction stroke with the outlet valve closed, fuel is fed into the cylinder through separate feeding valve means for providing a lean fuel/air mixture in the cylinder; during a compression stroke a first additional charge of fuel is fed into the cylinder by use of a considerable over pressure for igniting the lean fuel/air mixture and after ignition of the fuel/air mixture a second additional charge of fuel is fed into the cylinder for increasing the effective mean pressure of the engine. The second additional charge of fuel comprises a substantial part, and for achieving maximum mean effective pressures the main part, of the fuel fed into the cylinder during a working cycle of the process.

13 Claims, 2 Drawing Sheets

COMBUSTION PROCESS FOR INTERNAL COMBUSTION ENGINES USING GASEOUS FUEL

BACKGROUND OF THE INVENTION

This invention relates to an improved combustion process for internal combustion engines as well as to an arrangement for accomplishing the combustion process.

In a known internal combustion engine, a mixture of gaseous fuel and air is fed into a cylinder through an air inlet duct during a suction stroke of a piston in the cylinder, the mixture is compressed during a compression stroke and is ignited either by means of a spark or by self-ignition due to the increase in temperature caused by the compression. In order to facilitate ignition of such a gaseous fuel/air mixture when using spark ignition, the ignition plug may be located in a separate auxiliary chamber or similar space in communication with the combustion chamber of the cylinder and into which a small amount of additional gaseous fuel is fed for enriching the fuel/air mixture. It is also known to feed additional fuel into the cylinder when using compression ignition so as to enrich the mixture before ignition and thereby ensure proper ignition. In accordance with these concepts, however, the mixture in the cylinder is lean, whereby the combustion process in question is a so-called lean burn process. A lean burn combustion process is one in which the fuel and oxygen are present in proportions such that theoretically all the fuel can be burnt.

A disadvantage of the combustion processes that are carried out in the known engines referred to above is that the mean effective pressure that is generated in the cylinder is only about 12-14 bar. Moreover, in the known engines it is not possible to achieve scavenging of the cylinder by providing for the inlet and outlet valves to be open simultaneously, because some of the gaseous fuel fed through the inlet duct would pass directly into the outlet duct. An advantage of the lean burn process, on the other hand, is that the exhaust gases include a lower concentration of nitrogen oxides, $NO_x$, than the exhaust gases produced by rich burn processes, in where there is excess fuel that cannot be burned. Further, in a lean burn process the risk of untimely self-ignition is reduced or avoided.

SUMMARY OF THE INVENTION

According to the present invention, an improved combustion process for an internal combustion engine having at least one cylinder provided with valved inlet and outlet ducts includes feeding an initial charge of fuel into the cylinder during a suction stroke with the outlet duct closed through feeding valve means separate from the outlet duct for providing a lean fuel/air mixture in the cylinder, feeding a first additional charge of fuel into the cylinder during a compression stroke for facilitating ignition of the lean fuel/air mixture, and feeding a second additional charge of fuel into the cylinder after ignition of the fuel/air mixture for increasing the mean effective pressure of the engine.

The second additional charge of fuel comprises a substantial part of the total amount of fuel fed into the cylinder during a working cycle of the process. For achieving maximum mean effective pressures, the second additional charge of fuel comprises the main part of the the total amount of fuel fed into the cylinder during a working cycle of the process. Further, the second additional charge of fuel is supplied for achieving a mean effective pressure greater than about 12-14 bar, the amount of the second additional charge being increased with the mean effective pressure to be provided by the engine.

An advantage of the invention is that when the engine is under a low or moderate load, it is possible to use a lean fuel/air mixture and operate in accordance with the lean burn process, whereby no feeding of additional fuel after ignition is necessary or at least the amount of fuel to be fed may be relatively small. When the engine is under a heavy load, however, by supplying the second additional charge of fuel it is possible to generate a mean effective pressure that is much higher than can be achieved with engines operated according to the conventional lean burn process. In this case, the mean effective pressure may be well above 20 bar and even up to 30 bar. In addition, when the exact moment for ignition as well as for feeding fuel can be selected, it is possible to better optimize the concentration of nitrogen oxides ($NO_x$) in the exhaust gases.

The invention also makes it possible to scavenge the cylinders between the working cycles of the process in the normal manner, because pure air can be fed for this purpose via the inlet duct between the exhaust stroke and the suction stroke when the inlet valve and the outlet valve are momentarily open at the same time. After scavenging the cylinder in this way the outlet valve is closed, and only thereafter during the suction stroke is fuel fed into the cylinder, which takes place by means of separate feeding valve means.

Thus, by use of a process in accordance with the invention it is possible to eliminate or at least reduce the disadvantages of the combustion processes used in the known engines and provide a new combustion process in which lean basic fuel in the sense of the known lean burn process can be employed, but which allows considerably higher mean effective pressures in comparison with the known processes so as to enable higher engine loads than before. Additionally, ignition and burning can be better controlled thereby making it possible to improve the effectiveness of the engine and optimize concentration of nitrogen oxides in the exhaust gases.

BRIEF DESCRIPTION OF THE DRAWINGS

In the following the invention is described in greater detail with reference to the attached drawings, in which.

DETAILED DESCRIPTION

Figure 1:
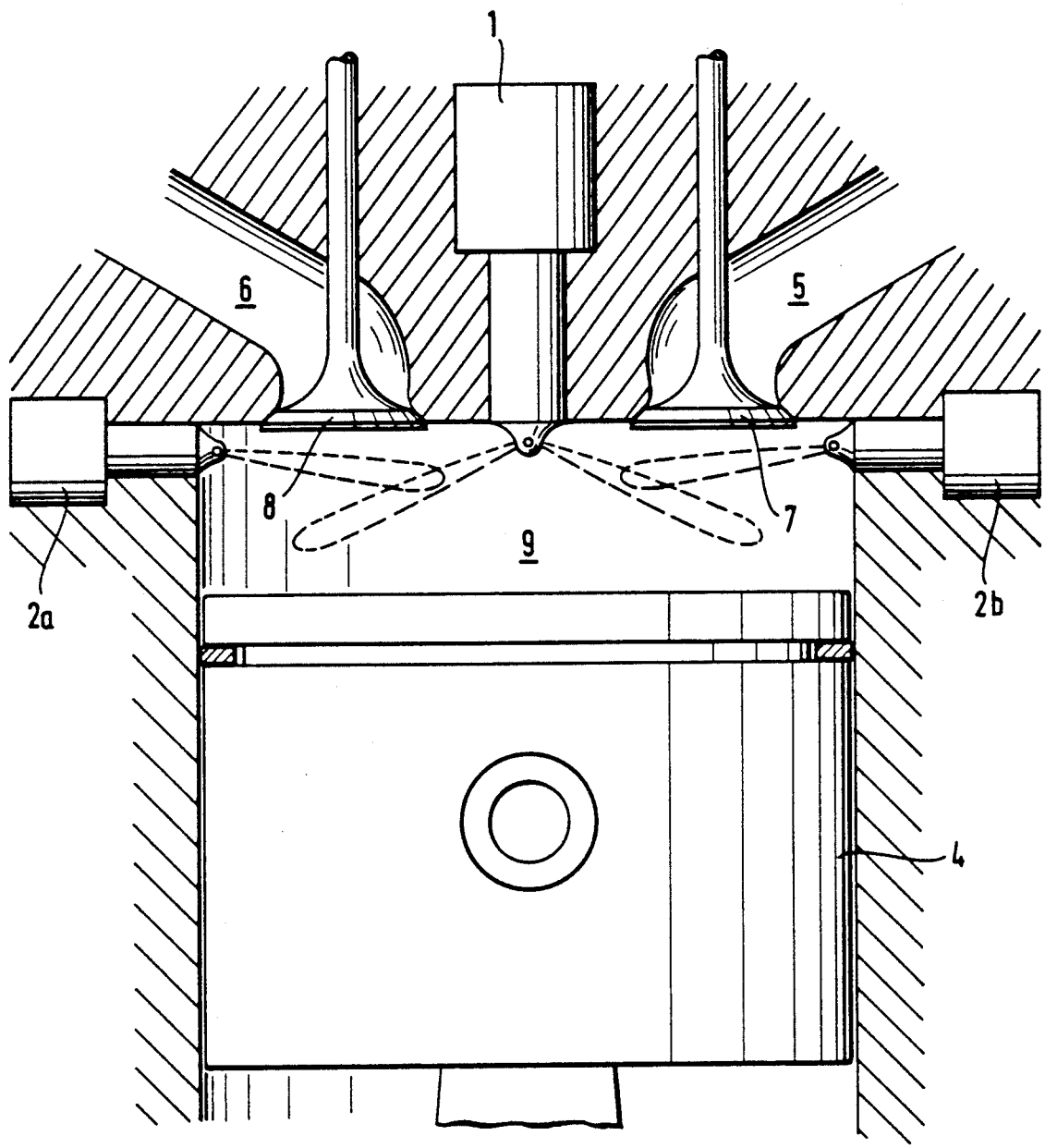
FIG. 1 shows schematically and in a cross-sectional view a cylinder of an engine making use of the combustion process according to the invention, whereby compression ignition is availed of in the combustion process.

In FIG. 1, the reference numeral 1 indicates a main fuel feeding valve for feeding gaseous fuel into a combustion chamber 9 and the reference numerals 2a, 2b indicate auxiliary fuel feeding valves. The fuel feeding valves are of conventional construction As shown in FIG. 1, the auxiliary feeding valves 2a, 2b are mounted in the engine block or cylinder liner. The cylinder includes in the normal way a reciprocatingly movable piston 4 and valves 7 and 8 controlling an outlet duct 5 and an inlet duct 6 respectively.

When the piston 4 passes the top dead center position between the exhaust stroke and the suction stroke, both the outlet valve 7 and the inlet valve 8 are simultaneously open for a moment so that the cylinder is scavenged by air from the inlet duct 6. When the piston 4 moves downwards during the suction stroke, the outlet valve 7 is closed while the inlet valve remains open, whereby air is drawn into the cylinder from the inlet duct 6. Gaseous fuel is fed into the combustion chamber 9 of the cylinder during the second part of the suction stroke, while the outlet valve is closed and the inlet valve is open The fuel is fed into the combustion chamber via either the main feeding valve 1 or the auxiliary feeding valve 2a. The inlet valve 8 is then closed and the piston moves upwards, executing the compression stroke, whereby the piston 4 compresses the mixture of gaseous fuel and air within the cylinder. The fuel/air mixture fed into the combustion chamber 9 during the suction stroke can be quite lean, as in a conventional lean burn process.

During the compression stroke, an additional charge of fuel is fed into the combustion chamber 9 through the auxiliary valve 2b under a considerable over pressure. The additional charge of fuel enriches the fuel/air mixture in the combustion chamber, and consequently compression ignition of the fuel, i.e. ignition due to heating of the mixture resulting from compression thereof during the compression stroke, is facilitated. Feeding of the additional charge of fuel for ignition can alternatively take place through the main valve 1 by providing it with separate nozzles for this purpose.

For greater loads, a second additional charge of fuel is fed into the cylinder after the actual ignition so as to further enrich the fuel mixture. The second additional charge is fed when the piston is at about top dead center. The fuel may be fed partly during the compression stroke and partly during the expansion stroke. The second additional charge of fuel then constitutes a substantial part of the fuel fed into the cylinder during a working cycle of the process. For achieving maximum mean effective pressures, the second additional charge may constitute the main part of the fuel fed into the cylinder during the working cycle. Feeding of the second additional charge of fuel is preferably effected by the main valve 1.

In the embodiment of FIG. 1, feeding of the second additional charge of fuel can in principle, naturally, take place also by either of the auxiliary valves 2a and 2b. Control for the valves can be accomplished in some conventional way, for instance hydraulically, pneumatically, mechanically or by using electronic control, so long as the control is exact enough and allows the interval during the working cycle in which the second additional charge is fed to be freely selected.

From the view point of space requirements the most advantageous location for the main valve, which is the biggest valve, is in practice the central region of the combustion chamber 9 in the cylinder head as shown in the figures. The auxiliary valves 2a and 2b can be located, if desired, in the cylinder head instead of in the engine block or cylinder liner. In practice, however, this may result in having to make them so small so as to only fulfill the minimum requirements, whereby they may no longer be well suited for feeding the second additional charge of fuel.

The additional charge of fuel that is fed during the compression stroke, and the second additional charge of fuel if the engine load is such as to demand a second additional charge of fuel, are fed into the cylinder under a considerable over pressure, for example using a pressure exceeding 100 bar and preferably exceeding 200 bar.

Figure 2:
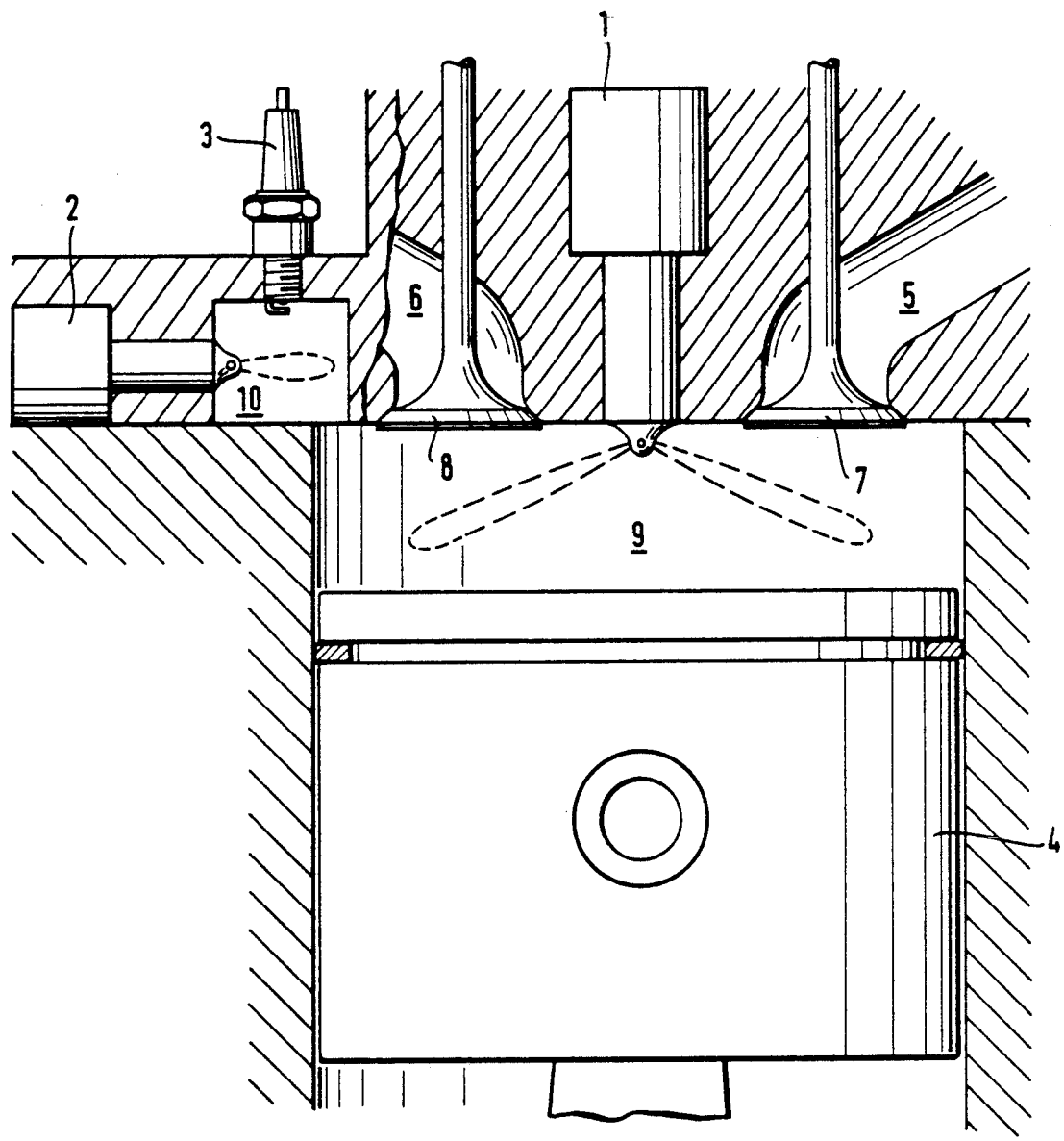
FIG. 2 shows schematically and in a cross-section view a cylinder of another engine making use of the combustion process according to the invention, whereby spark ignition is availed of in the combustion process.

The embodiment of FIG. 2 differs from the embodiment of FIG. 1 in that an auxiliary chamber 10 is arranged in communication with the combustion chamber 9, and the additional charge of fuel for ignition is fed into the auxiliary chamber by way of an auxiliary valve 2. Ignition is accomplished by use of a spark from an ignition plug 3 that also extends into chamber 10. Feeding of the second additional charge of fuel is preferably effected by the main valve 1.

Since the timing of the spark from the ignition plug, the feeding interval for the first additional charge of fuel, fed via the main valve 1 or the auxiliary valve 2 or valves 2a, 2b, and the feeding interval for the second additional charge of fuel can all be freely selected, the whole combustion process can be well controlled. Consequently, the concentration of nitrogen oxides in the exhaust gases can be optimized at the same time as the basic mixture provided during the suction stroke can at all times be lean. By providing the second additional charge of fuel after ignition has been initiated, the risk of untimely self-ignition is reduced or avoided.

The invention is not limited to the embodiments shown, but several modifications are feasible within the scope of the appended claims. For example, the invention is not limited to use with gaseous fuels but is also applicable to liquid fuels.

What is claimed:

1. An improved combustion process for an internal combustion engine including at least one cylinder provided with valved inlet and outlet ducts, said process including the following steps:

feeding an initial charge of gaseous fuel into the cylinder during a suction stroke with the outlet duct closed through feeding valve means separate from the inlet duct for providing a lean fuel/air mixture in the cylinder;

feeding a first additional charge of fuel into the cylinder during a compression stroke for facilitating ignition of the lean fuel/air mixture, and feeding a second additional charge of fuel into the cylinder after ignition of the fuel/air mixture for increasing the mean effective pressure of the engine.

2. A combustion process according to claim 1, wherein said second additional charge of fuel comprises a substantial part of the total amount of fuel fed into the cylinder during a working cycle of the process.

3. A combustion process according to claim 1, wherein said second additional charge of fuel is supplied for achieving a mean effective pressure of at least about 12-14 bar for the engine, the quantity of fuel provided in the second additional charge being increased with the mean effective pressure to be provided by the engine.

4. A combustion process according to claim 1, wherein, for achieving maximum mean effective pressures, said second additional charge of fuel comprises the main part of the total amount of fuel fed into the cylinder during a working cycle of the process.

5. A combustion process according to claim 1, including the step of scavenging the cylinder between exhaust stroke and suction stroke by means of air from the inlet valve, when the inlet and outlet valves are simultaneously open for a moment but before fuel is fed during the suction stroke.

6. A combustion process according to claim 1, wherein the fuel is gaseous and the method comprises the step of feeding fuel under a pressure exceeding 100 bar.

7. A combustion process according to claim 1, wherein the fuel is gaseous and the method comprises the step of feeding fuel under a pressure exceeding 200 bar.

8. An internal combustion engine including at least one cylinder bounding a combustion chamber, valved inlet and outlet ducts for introducing air into the combustion chamber and exhausting gas from the combustion chamber, feeding valve means separate from the inlet duct for feeding fuel into cylinder during suction stroke for providing a lean fuel/air mixture in the cylinder, and means whereby the engine may be operated in accordance with the following process:

feeding a first charge of fuel into the cylinder during a suction stroke with the outlet duct closed, to form a lean fuel/air mixture in the cylinder, feeding a first additional charge of gaseous fuel into the cylinder during a compression stroke by means of said feeding valve means for facilitating ignition of the lean fuel/air mixture, and after ignition of the fuel/air mixture, feeding a second additional charge of fuel into the cylinder by means of said feeding valve means for increasing the mean effective pressure of the engine.

9. An engine according to claim 8, wherein said feeding valve means comprise a first feeding valve for feeding fuel during a suction stroke while the outlet duct is closed and a second feeding valve for feeding said first additional charge of fuel.

10. An engine according to claim 9, wherein said first feeding valve is the main valve and has a larger nozzle area than the second feeding value, said first feeding valve being located in the cylinder head in the central part thereof relative to the combustion chamber of the cylinder.

11. An engine according to claim 9, wherein said second additional charge of fuel is fed by means of said first feeding valve.

12. An engine according to claim 9, including a third feeding valve through which at least one of said additional charges of fuel is fed.

13. An engine according to claim 9, wherein the cylinder is provided with spark ignition means for initiating ignition, said spark ignition means and said second feeding valve being located in a auxiliary chamber that is in communication with the combustion chamber of the cylinder.

* * * * *